(12) United States Patent
Okubo et al.

(10) Patent No.: US 12,202,184 B2
(45) Date of Patent: Jan. 21, 2025

(54) DEVICE FOR ASSISTING MOLDING CONDITION DETERMINATION AND INJECTION MOLDING APPARATUS

(71) Applicant: JTEKT Corporation, Osaka (JP)

(72) Inventors: Yusuke Okubo, Kariya (JP); Masaharu Hasuike, Kariya (JP); Toshiyuki Baba, Kashihara (JP); Kouji Kimura, Shiki-gun (JP)

(73) Assignee: JTEKT Corporation, Osaka (JP)

( * ) Notice: Subject to any disclaimer, the term of this patent is extended or adjusted under 35 U.S.C. 154(b) by 1527 days.

(21) Appl. No.: 16/572,892

(22) Filed: Sep. 17, 2019

(65) Prior Publication Data

US 2020/0094461 A1    Mar. 26, 2020

(30) Foreign Application Priority Data

Sep. 20, 2018  (JP) ................................ 2018-175570
Dec. 28, 2018  (JP) ................................ 2018-247357

(51) Int. Cl.
*B29C 45/77*     (2006.01)
*B29C 31/04*     (2006.01)
(Continued)

(52) U.S. Cl.
CPC .............. *B29C 45/77* (2013.01); *B29C 31/04* (2013.01); *B29C 45/766* (2013.01); *G05B 13/0265* (2013.01); *B29C 2945/76006* (2013.01); *B29C 2945/76257* (2013.01); *B29C 2945/76384* (2013.01); *B29C 2945/76498* (2013.01); *B29C 2945/76501* (2013.01); *B29C 2945/76735* (2013.01); *B29C 2945/76862* (2013.01); *B29C 2945/76949* (2013.01)

(58) Field of Classification Search
CPC ............ B29C 2945/76949; B29C 2945/76979
See application file for complete search history.

(56) References Cited

U.S. PATENT DOCUMENTS

2003/0050728 A1*  3/2003  Sarabi ..................... B29C 45/76
                                                706/912
2017/0031330 A1   2/2017  Shiraishi et al.
2019/0118443 A1*  4/2019  Asaoka ............... G05B 23/024

FOREIGN PATENT DOCUMENTS

DE         19518804 A1 *  12/1995   ........... B29C 45/766
JP         5-96592 A       4/1993
(Continued)

OTHER PUBLICATIONS

Translation of DE-19518804-A1 (Year: 1995).*

*Primary Examiner* — John J DeRusso
(74) *Attorney, Agent, or Firm* — Oblon, McClelland, Maier & Neustadt, L.L.P.

(57) ABSTRACT

A device for assisting molding condition determination includes a molding state data adjustment amount obtaining unit and a molding condition element adjustment amount obtaining unit. The molding state data adjustment amount obtaining unit obtains, using a first learning model, a molding state data adjustment amount having a value equivalent to a difference between molding state data detected by a sensor and a molding state data target value. The molding condition element adjustment amount obtaining unit obtains, using a second learning model, an adjustment amount for a molding condition element corresponding to the molding state data adjustment amount.

12 Claims, 10 Drawing Sheets

(51) Int. Cl.
*B29C 45/76* (2006.01)
*G05B 13/02* (2006.01)

(56) References Cited

FOREIGN PATENT DOCUMENTS

| | | |
|---|---|---|
| JP | 5-309711 A | 11/1993 |
| JP | 2017-030152 A | 2/2017 |

* cited by examiner

| | | |
|---|---|---|
| MOLDING STATE DATA | MOLD TEMPERATURE DATA | FIRST LEARNING DATA |
| | DWELL PRESSURE DATA | |
| | ⋮ | |
| MOLDED ARTICLE QUALITY ELEMENT | MASS | |
| | SHAPE | |
| | VOID | |
| | BURN | |
| | ⋮ | |

| | | |
|---|---|---|
| MOLDING STATE DATA | MOLD TEMPERATURE DATA | SECOND LEARNING DATA |
| | DWELL PRESSURE DATA | |
| | ⋮ | |
| MOLDING CONDITION ELEMENT | MASS TEMPERATURE | |
| | DWELL PRESSURE | |
| | INJECTION SPEED | |
| | DWELL TIME | |
| | ⋮ | |

DEVICE FOR ASSISTING MOLDING CONDITION DETERMINATION AND INJECTION MOLDING APPARATUS

INCORPORATION BY REFERENCE

The disclosures of Japanese Patent Applications No. 2018-175570 and No. 2018-247357 respectively filed on Sep. 20, 2018 and Dec. 28, 2018, each including the specification, drawings and abstract, are incorporated herein by reference in their entireties.

BACKGROUND OF THE INVENTION

1. Field of the Invention

The invention relates to a device for assisting molding condition determination and an injection molding apparatus.

2. Description of Related Art

In a method of molding articles by feeding molten material into a cavity of a mold, such as injection molding, if defects occur in the molded article, an operator needs to change the molding conditions. Since the molding method uses molten material and a mold, the quality of molded articles is influenced by various factors such as: the environment of the area where a factory equipped with molding equipment is located; the environment inside the factory; the installation condition of the equipment in the factory; age deterioration of the equipment; and season. Therefore, some experience and skill are required to change the molding conditions by taking into account such various factors. It is difficult for an unskilled operator to determine how much and which molding condition needs to be changed.

These days, with improvements in computer processing speed, artificial intelligence is developing rapidly. For example, Japanese Unexamined Patent Application Publication No. 2017-30152 (JP 2017-30152 A) discloses that machine learning is used to reduce the time taken to adjust operating conditions for injection molding. Specifically, a reward is calculated based on both physical amount data relating to a molded article (corresponding to the quality of a molded article) and reward conditions for machine learning, and an adjustment of the operating conditions is performed by machine learning based on the reward, the operating conditions, and the physical amount data.

Examples of the physical amount data include: the mass and shape of a molded article; an appearance, a length, an angle, an area, and a volume calculated from image data on a molded article; the result of an optical inspection of an optically molded article; and the strength measurement result of a molded article. That is, the physical amount data corresponds to the quality of a molded article. Examples of the operating conditions (corresponding to molding conditions) include: a mold clamping condition, an ejector condition, an injection dwell condition, a measuring condition, a temperature condition, a nozzle touch condition, a resin feed condition, a mold thickness condition, a molded article removal condition, and a hot-runner condition. The technique disclosed in JP 2017-30152 A is intended to automatically adjust molding conditions when defects occur in a molded article. This eliminates the need of manual adjustment by an operator.

According to JP 2017-30152 A, a reward is determined on the basis of a quality element of a molded article, and molding conditions are adjusted on the basis of the reward.

As described above, the quality element of a molded article is as follows: the mass and shape of a molded article; an appearance, a length, an angle, an area, and a volume calculated from image data on a molded article; the result of an optical inspection of an optically molded article; and the strength measurement result of a molded article. That is, the quality element of a molded article is obtained in an inspection process that is conducted after molding of the article is finished. If it possible to predict the likelihood of defects occurring in the molded article before the inspection process, production of defective molded articles may be curbed.

SUMMARY OF THE INVENTION

A purpose of the invention is to provide a device for assisting molding condition determination and an injection molding apparatus, capable of adjusting a molding condition element using information that is obtainable before a quality element of a molded article is obtained.

A first aspect of the invention provides a device for assisting molding condition determination and for use with a molding method that molds an article by feeding molten material into a cavity of a mold of a molding apparatus. The device includes the following: a first learning model storage unit that stores a first learning model created through machine learning in which at least molding state data detected during molding of the article by a sensor attached to the molding apparatus is used as first learning data, the first learning model relating to the molding state data and a quality element of the molded article; a second learning model storage unit that stores a second learning model created through machine learning in which the molding state data and a molding condition element are used as second learning data, the second learning model relating to the molding state data and the molding condition element; a molding state data adjustment amount obtaining unit that obtains, using the first learning model, a molding state data adjustment amount having a value equivalent to a difference between the molding state data detected by the sensor and a target value for the molding state data; and a molding condition element adjustment amount obtaining unit that obtains, using the second learning model, an adjustment amount for the molding condition element corresponding to the molding state data adjustment amount.

In an inference phase of machine learning, the molding state data is obtained, and the adjustment amount for the molding condition element is obtained on the basis of the molding state data. The molding state data is detected by the sensor attached to the molding apparatus. That is, the molding state data is information obtainable before the quality element of the molded article is obtained in an inspection process. This makes it possible to predict the likelihood of defects occurring in the molded article before the inspection process, thus curbing production of defective molded articles.

However, the quality element of the molded article is an important element. For this reason, the device stores the first learning model relating to the molding state data and the quality element of the molded article. The molding state data adjustment amount is obtained taking into account the first learning model and the molding state data so as to allow the quality element of the molded article to meet a predetermined value.

Further, the device stores the second learning model that indicates the relationship between the molding state data and the molding condition element. The adjustment amount for the molding condition element is obtained taking into account the second learning model and the molding state data adjustment amount. Thus, the molding condition element is adjusted in accordance with the obtained adjustment amount for the molding condition element so as to improve the quality element of the molded article.

A second aspect of the invention provides an injection molding apparatus including the device according to the first aspect. This improves the quality of an article molded by the injection molding apparatus.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

A molding condition determination assisting device 50 (hereinafter referred to simply as the assisting device 50) according a first embodiment is used with a molding method that molds an article by feeding molten material into a mold of a molding apparatus. For example, the molding method may be injection molding of resin, rubber, or the like, or may be metal casting such as die casting. In the description below, injection molding is mainly taken as an example of the molding method to describe the assisting device 50.

Figure 1:
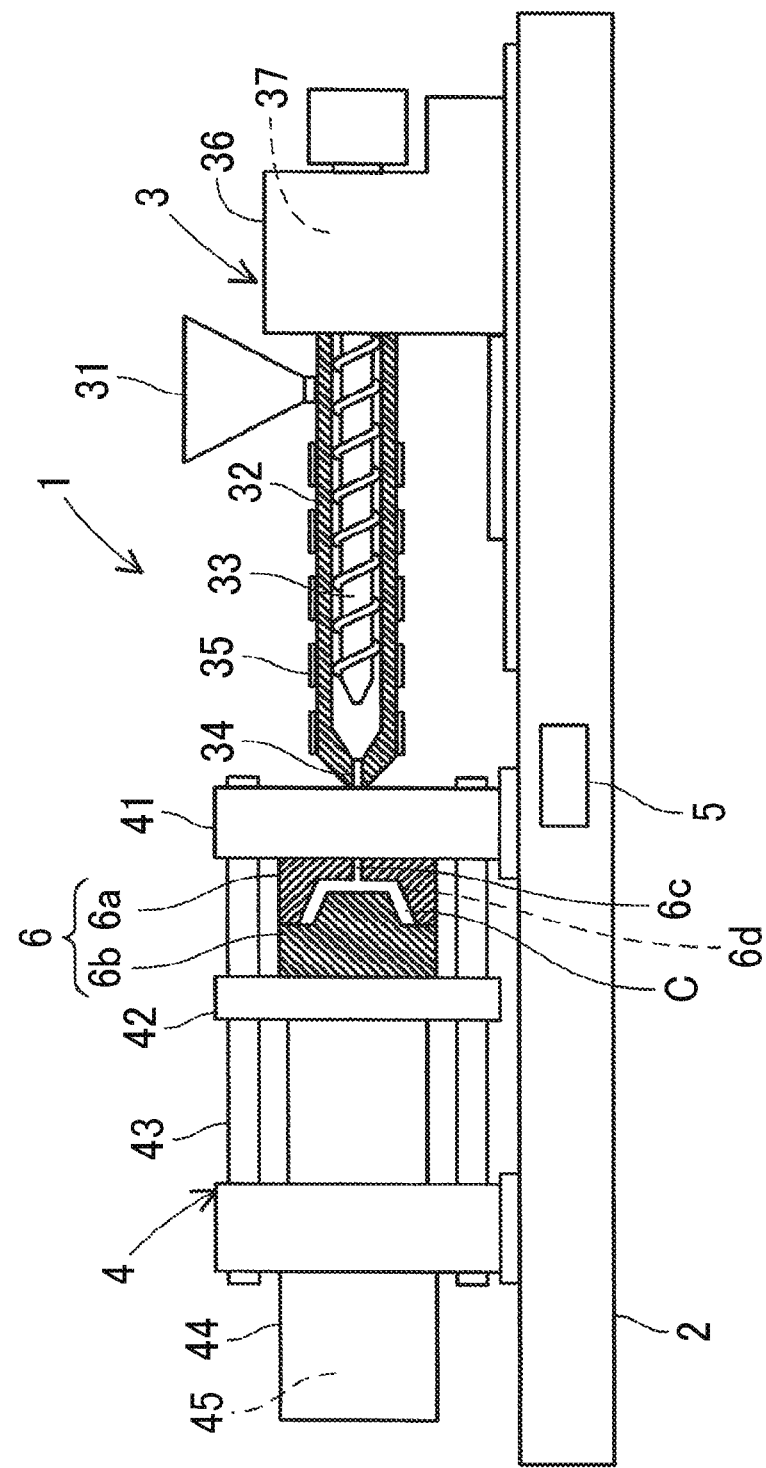
FIG. 1 is a diagram illustrating an injection molding apparatus.

An injection molding apparatus 1 for performing injection molding is described with reference to FIG. 1. The assisting device 50 may be either included in the injection molding apparatus 1 or separated from the injection molding apparatus 1. The injection molding apparatus 1 includes a bed 2, an injection device 3, a clamping device 4, and a control device 5. The injection device 3 is mounted on the bed 2.

The injection device 3 heats and melts molding material and then injects the molding material under high pressure into a cavity C of a mold 6. The molding material that has been heated and molten is hereinafter referred to as molten material.

The injection device 3 includes a hopper 31, a heating cylinder 32, a screw 33, a nozzle 34, a heater 35, a drive device 36, and an injection device sensor 37. Pellets (molding material in the form of particles) are fed into the hopper 31. The heating cylinder 32 heats and melts the pellets in the hopper 31 into molten material and pressurizes the molten material. The heating cylinder 32 is axially movable relative to the bed 2. The screw 33 is mounted inside the heating cylinder 32 in a manner such that the screw 33 is rotatable and axially movable in the heating cylinder 32.

The nozzle 34 is an injection opening provided at the tip of the heating cylinder 32 and feeds the molten material in the heating cylinder 32 into the cavity C of the mold 6 in accordance with the axial movement of the screw 33. The heater 35 is mounted, for example, to the outside of the heating cylinder 32 and heats the pellets in the heating cylinder 32. The drive device 36 performs the axial movement of the heating cylinder 32 and also performs the rotation and axial movement of the screw 33. The injection device sensor 37 is a general term for sensors that obtain various types of information relating to the injection device 3, including: the amount of stored molten material; a dwell pressure; a dwell time; an injection speed; and the condition of the drive device 36. The injection device sensor 37 may obtain information other than that described above.

The clamping device 4 is mounted on the bed 2 and faces the injection device 3. The clamping device 4 opens and closes the mold 6 attached thereto, and also clamps the mold 6 such that the mold 6 is not opened by pressure of the molten material injected into the cavity C of the mold 6.

The clamping device 4 includes a fixed platen 41, a movable platen 42, a tie bar 43, a drive device 44, and a clamping device sensor 45. A first mold 6a as a fixed part of the mold 6 is fixed to the fixed platen 41. The fixed platen 41 is abutable with the nozzle 34 of the injection device 3 and guides the molten material injected from the nozzle 34 into the cavity C of the mold 6. The cavity C is a space formed between the first mold 6a and a second mold 6b and has a shape corresponding to the shape of an article to be molded. The second mold 6b as a movable part of the mold 6 is fixed to the movable platen 42. The movable platen 42 is movable toward and away from the fixed platen 41. The tie bar 43 supports the movement of the movable platen 42. The drive device 44 moves the movable platen 42. For example, the drive device 44 may be structured as a cylinder device. The clamping device sensor 45 is a general term for sensors that obtain various types of information relating to the clamping device 4, including: a mold clamping force; a mold temperature; and the condition of the drive device 44.

The cavity C of the mold 6 is formed between the first mold 6a and the second mold 6b. The first mold 6a has a feed channel 6c (a sprue, a runner, and a gate) from the nozzle 34 to the cavity C. The first mold 6a or the second mold 6b includes first and second pressure sensors 6d and 6e. The pressure sensors 6d and 6e detect pressure applied from the molten material.

The control device 5 controls both the drive device 36 of the injection device 3 and the drive device 44 of the clamping device 4 on the basis of a command value for a molding condition. Specifically, the control device 5 obtains various types of information from the injection device sensor 37, the clamping device sensor 45, and the pressure sensors 6d and 6e, and controls the drive device 36 of the injection device 3 and the drive device 44 of the clamping device 4 so as to cause the injection device 3 and the clamping device 4 to operate in accordance with the command value.

Below is a description of a method of injection molding performed by the injection molding apparatus 1. The injection molding method includes the following successive steps: a measuring step; a clamping step; an injection filling step; a dwell step; a cooling step; and a removing step. In the measuring step, pellets are melted into molten material by heat from the heater 35 and by shear frictional heat generated by rotation of the screw 33, and the molten material is stored between the tip of the heating cylinder 32 and the nozzle 34. As the amount of the stored molten material increases, the screw 33 retracts. Thus, the amount of the stored molten material is measured from a retracted position of the screw 33.

Then, in the clamping step, by moving the movable platen 42, the first mold 6a and the second mold 6b are brought together to clamp the mold 6. Further, the nozzle 34 is connected to the fixed platen 41 of the clamping device 4. Next, in the injection filling step, by moving the screw 33 that stops rotating toward the nozzle 34 by a predetermined pressing force, the molten material is injected at high pressure into the cavity C of the mold 6 and fills the cavity C.

In the dwell step after the injection filling step, the molten material is further pressed into the cavity C filled with the molten material, thereby performing a dwell process that applies a predetermined dwell pressure to the molten material inside the cavity C for a predetermined period of time. Specifically, the predetermined dwell pressure is applied to the molten material by applying a constant pressing force to the screw 33. The pressure of the molten material in the cavity C varies depending on the location inside the cavity C.

After the dwell process at the predetermined dwell pressure is finished, the process proceeds to the cooling step. In the cooling step, the pressing of the molten material is stopped to reduce the dwell pressure (this process is hereinafter referred to as a dwell pressure reduction process), and also the mold 6 is cooled. As the mold 6 cools, the molten material in the cavity C of the mold 6 solidifies. Finally, in the removing step, a molded article is removed by separating the first mold 6a and the second mold 6b from each other.

Next, the structure of the assisting device 50 according to the first embodiment is described with reference to FIGS. 2 to 5. The assisting device 50 includes a portion functioning in a learning phase of machine learning and a portion functioning in an inference phase of the machine learning.

Figure 2:
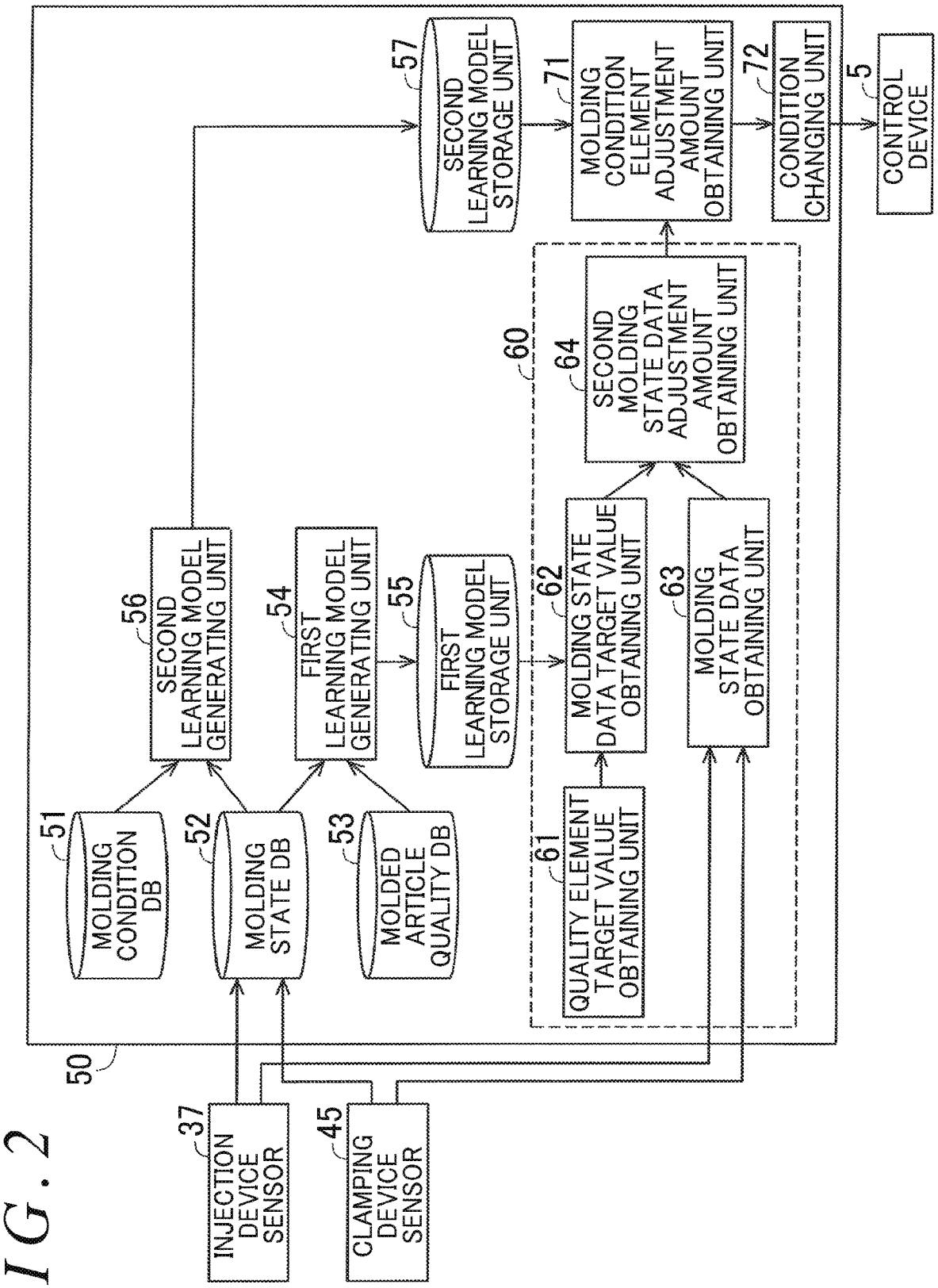
FIG. 2 is a block diagram of a molding condition determination assisting device according to a first embodiment.

Specifically, as illustrated in FIG. 2, the assisting device 50 includes the following, as the portion functioning in the learning phase: a molding condition database (DB) 51; a molding state database (DB) 52; a molded article quality database (DB) 53; a first learning model generating unit 54; a first learning model storage unit 55; a second learning model generating unit 56; a second learning model storage unit 57. Further, the assisting device 50 includes the following, as the portion functioning in the inference phase: the first learning model storage unit 55; the second learning model storage unit 57; a molding state data adjustment amount obtaining unit 60; a molding condition element adjustment amount obtaining unit 71; and a condition changing unit 72.

Molding condition elements for a large number of articles to be molded that are input as command values to the control device 5 are stored in the molding condition database 51 in association with the respective articles. For example, the molding condition element includes the following: a mold temperature; a dwell pressure; an injection speed; a dwell time; a mold clamping force; and the amount of molten material stored in the heating cylinder 32. The molding condition database 51 stores such molding condition elements relating to a large number of articles to be molded. That is, the molding condition database 51 stores molding condition elements regarding the shapes and materials of a large number of articles to be molded.

Molding state data that is detected during molding of articles by the injection device sensor 37, the clamping device sensor 45, and the pressure sensors 6d and 6e attached to the injection molding apparatus 1 is stored in the molding state database 52 in association with the respective molded articles. The molding state data is data obtained during molding of an article.

Figures 3, 4, 5:
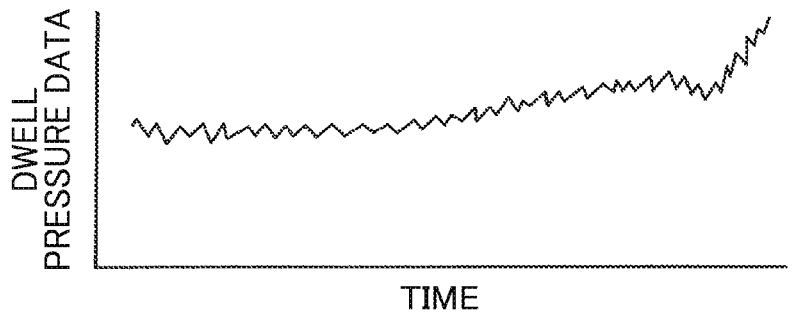
FIG. 3 is a graph of change in dwell pressure data, as an example of molding state data, over time during molding of one article.
FIG. 4 is a diagram illustrating first learning data used in a first learning model generating unit.
FIG. 5 is a diagram illustrating second learning data used in a second learning model generating unit.

The molding state data may be information about how a subject data item behaves over time or may be a predetermined statistical amount obtained from the behavior information. For example, as illustrated in FIG. 3, the molding state data may be information about how dwell pressure data behaves over time during molding of one article or may be a statistical amount obtained from the behavior information.

There are behaviors of a subject data item contained in the behavior information in the same number as the number of the sampling time values. Examples of the statistical amount include the following: an integral value over the whole period (from the start to end of molding of one article); an integral value over a predetermined part of the whole period; a derivative value at a predetermined time; a maximum value; and a maximum derivative value. In addition to the dwell pressure data, the molding state data may include, for example, mold temperature data, injection speed data, mold clamping force data, and the amount of molten material stored in the heating cylinder 32.

The dwell pressure data may be data about the pressing force applied to the screw 33 and detected by the injection device sensor 37 or may be data about pressures in the mold 6 detected by the pressure sensors 6d and 6e. Although the pressing force applied to the screw 33 is a parameter controllable by the control device 5, the pressure detected by the pressure sensors 6d and 6e is not a parameter controllable by the control device 5.

The molded article quality database 53 stores quality elements of a large number of molded articles in association with the respective molded articles. The quality element may include the following items: the mass of a molded article; the shape of the molded article; the condition of voids in the molded article; and the condition of burns on the molded article. The quality element is information obtained after molding of the article through inspection by an inspection apparatus (not illustrated) or any other suitable method. The quality element may be an inspection value of each item directly obtained by the inspection or may be an evaluation value derived from the inspection value.

According to the first embodiment, the molding condition database 51, the molding state database 52, and the molded article quality database 53 are separate databases. Alternatively, these databases 51, 52, and 53 may be an integrated database. In the case of an integrated database, the molding condition element, the molding state data, and the quality element are stored in association with individual molded articles.

As illustrated in FIG. 4, the first learning model generating unit 54 performs machine learning in which at least the molding state data stored in the molding state database 52 is used as first learning data. According to the first embodiment, not only the molding state data but also the quality element stored in the molded article quality database 53 are used as the first learning data in the machine learning performed by the first learning model generating unit 54. Through the machine learning, the first learning model generating unit 54 generates a first learning model relating to the molding state data and the quality element. According to the first embodiment, supervised learning is used to create the first learning model. Alternatively, any other suitable machine learning algorithm may be used to create the first learning model. For example, the first learning model may be a regression model. The first learning model created by the first learning model generating unit 54 is stored in the first learning model storage unit 55.

As illustrated in FIG. 5, the second learning model generating unit 56 performs machine learning in which the molding state data stored in the molding state database 52 and the molding condition element stored in the molding condition database 51 are used as second learning data. Through the machine learning, the second learning model generating unit 56 generates a second learning model relating to the molding state data and the molding condition element. For example, the second learning model may be a regression model or the like. The second learning model created by the second learning model generating unit 56 is stored in the second learning model storage unit 57.

The molding state data adjustment amount obtaining unit 60 obtains, using the first learning model, a molding state data adjustment amount during molding of a subject article. Specifically, the molding state data adjustment amount obtaining unit 60 obtains the molding state data adjustment amount on the basis of the molding state data detected by the injection device sensor 37 and the clamping device sensor 45. The molding state data adjustment amount is a value equivalent to the difference between the molding state data detected by the sensors 37 and 45 and a molding state data target value.

The molding state data adjustment amount obtaining unit 60 includes a quality element target value obtaining unit 61, a molding state data target value obtaining unit 62, a molding state data obtaining unit 63, and a second molding state data adjustment amount obtaining unit 64.

The quality element target value obtaining unit 61 obtains a quality element target value for the subject article. For example, the quality element target value may be a threshold value for determining whether or not the subject article is a conforming article in terms of the quality element. The subject article is an article being molded now or to be molded from now. The quality element target value is preset information. The quality element target value obtaining unit 61 obtains the quality element target value for the subject article by input from an operator. Examples of the quality element target value include the following: a target mass value expressed in units of kilograms (kg); a target shape value expressed in units of meters (m); an index of the condition of voids; and an index of the condition of burns.

The molding state data target value obtaining unit 62 obtains, using the first learning model stored in the first learning model storage unit 55, a molding state data target value corresponding to the quality element target value obtained by the quality element target value obtaining unit 61. As already mentioned, the first learning model is a model relating to the molding state data and the quality element. Thus, in response to input of the quality element target value, the first learning model outputs information regarding the molding state data, specifically, the molding state data target value. The molding state data target value is of the same type as the molding state data stored in the molding state database 52. That is, the molding state data target value may be information about how a corresponding data item behaves over time or may be a predetermined statistical amount obtained from the behavior information.

During molding of a subject article, the molding state data obtaining unit 63 obtains molding state data detected by the injection device sensor 37, the clamping device sensor 45, and the pressure sensors 6d and 6e. The molding state data obtained by the molding state data obtaining unit 63 is of the same type as the molding state data stored in the molding state database 52. That is, the molding state data may be information about how a data item being detected behaves over time or may be a predetermined statistical amount obtained from the behavior information.

The second molding state data adjustment amount obtaining unit 64 calculates the difference between the molding state data obtained by the molding state data obtaining unit 63 and the molding state data target value obtained by the molding state data target value obtaining unit 62, and obtains the calculated difference as the molding state data adjustment amount.

The molding condition element adjustment amount obtaining unit 71 obtains, using the second learning model stored in the second learning model storage unit 57, a molding condition element adjustment amount corresponding to the molding state data adjustment amount obtained by the second molding state data adjustment amount obtaining unit 64. As already mentioned, the second learning model is a model relating to the molding state data and the molding condition element. Thus, in response to input of the molding state data adjustment amount using the second learning model, information regarding the molding condition element, specifically, the molding condition element adjustment amount, is output. The molding condition element adjustment amount is an adjustment amount for the molding condition element and may be, for example, an increase of five degrees in command value for a mold temperature.

On the basis of the molding condition element adjustment amount obtained by the molding condition element adjustment amount obtaining unit 71, the condition changing unit 72 changes the value of the molding condition element (the command value) in the control device 5 of the injection molding apparatus 1. The condition changing unit 72 automatically executes the change process, without receiving an execution signal from an operator. Alternatively, the condition changing unit 72 may execute the change process upon receipt of the execution signal from an operator.

Figure 6:
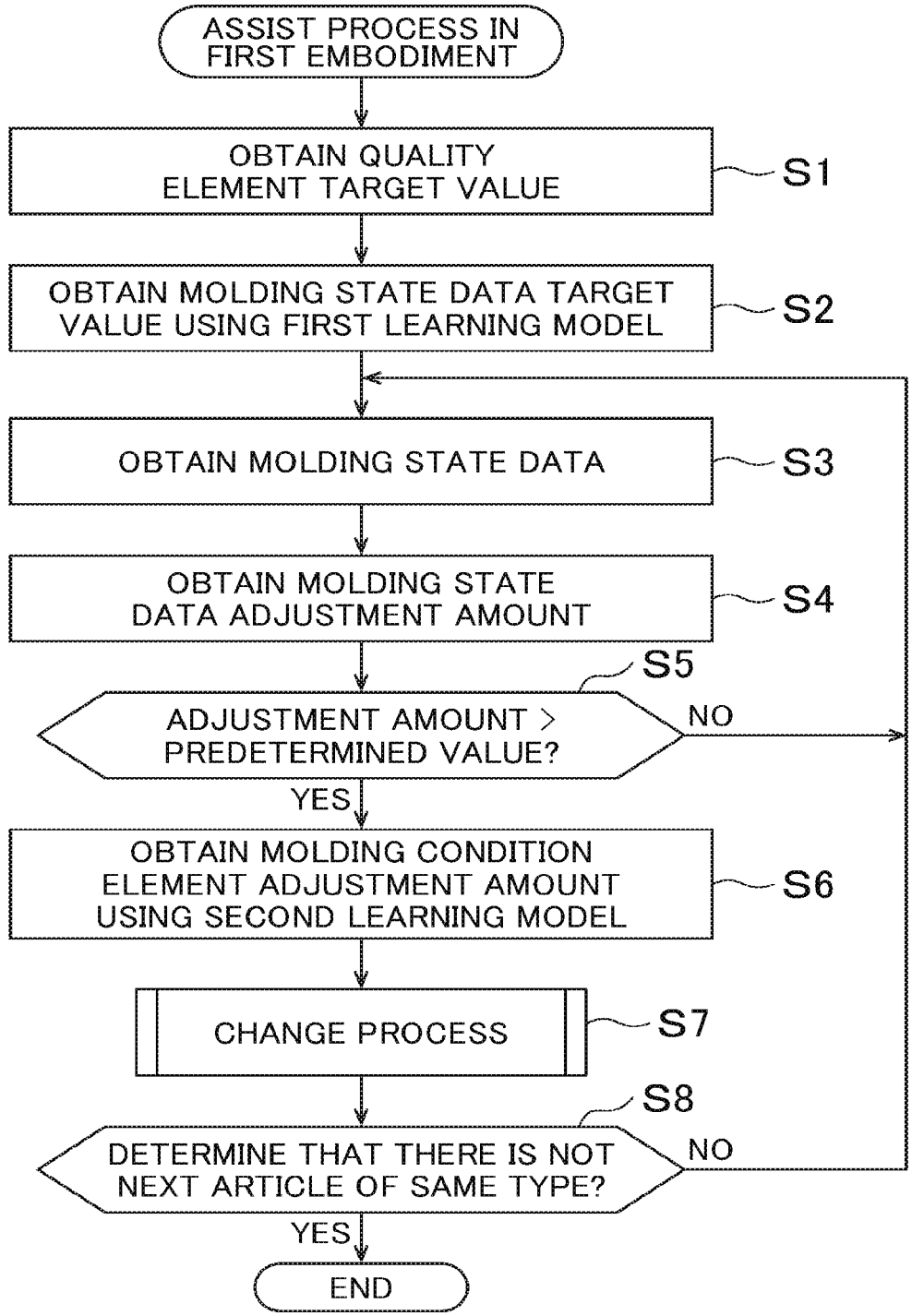
FIG. 6 is a flowchart of an assist process performed by the molding condition determination assisting device according to the first embodiment.

Referring to FIG. 6, an assist process performed by the assisting device 50 according to the first embodiment is described. The assist process has a learning phase and an inference phase. For the sake of brevity, only the inference phase of the assist process is described here. That is, the following description refers to the assist process to be performed after the first learning model and the second learning model are created.

First, the quality element target value obtaining unit 61 obtains a quality element target value (S1). Next, the molding state data target value obtaining unit 62 obtains, using the first learning model, a molding state data target value corresponding to the quality element target value (S2). Then, the molding state data obtaining unit 63 obtains molding state data (S3) during molding of an article. After that, on the basis of the molding state data and the molding state data target value, the second molding state data adjustment amount obtaining unit 64 obtains a molding state data adjustment amount (S4). The molding state data adjustment amount is the difference between the molding state data and the molding state data target value.

Then, the molding condition element adjustment amount obtaining unit 71 determines whether the molding state data adjustment amount is greater than a predetermined value (S5). If the adjustment amount is not greater than the predetermined value (S5: No), the assist process returns to step S3 and repeats the above procedures. In contrast, if the adjustment amount is greater than the predetermined value (S5: Yes), the molding condition element adjustment amount obtaining unit 71 obtains, using the second learning model, a molding condition element adjustment amount (S6).

Next, the condition changing unit 72 changes the value of a molding condition element in the control device 5, on the basis of the molding condition element adjustment amount (S7). If it is not determined that there is not a next article to be molded that is of the same type as the molded article (S8: No), the assist process returns to step S3 and repeats the same procedures for the next article. In contrast, if it is determined that there is not a next article to be molded that is of the same type (S8: Yes), the assist process ends. If there is a next article to be molded that is of a different type from the molded article, the assist process restarts from step S1.

As described above, in the inference phase of the machine learning, molding state data is obtained, and a molding condition element adjustment amount is obtained on the basis of the molding state data. The molding state data is detected by the sensors 37 and 45 attached to the injection molding apparatus 1. That is, the molding state data is information obtainable before the quality element of the molded article is obtained in an inspection process. This makes it possible to predict the likelihood of defects occurring in the molded article before the inspection process, thus curbing production of defective molded articles.

However, the quality element of the molded article is an important element. For this reason, the assisting device 50 creates the first learning model that indicates the relationship between the molding state data and the quality element of the molded article. The molding state data adjustment amount is obtained taking into account the first learning model and the molding state data so as to allow the quality element of the molded article to meet a predetermined value.

The assisting device 50 further creates the second learning model that indicates the relationship between the molding state data and the molding condition element. The molding condition element adjustment amount is obtained taking into account the second learning model and the molding state data adjustment amount. Thus, the molding condition element is adjusted in accordance with the obtained molding condition element adjustment amount so as to improve the quality element of the molded article.

Specifically, in the molding state data adjustment amount obtaining unit 60, the molding state data target value obtaining unit 62 obtains, using the first learning model, a molding state data target value corresponding to a quality element target value that is preset. Then, the second molding state data adjustment amount obtaining unit 64 obtains the difference between the molding state data target value and the molding state data detected by the sensors 37 and 45, thereby obtaining the molding state data adjustment amount. In this way, using the first learning model makes it possible to obtain the molding state data target value and consequently to obtain the molding state data adjustment amount. Thus, the molding state data adjustment amount is reliably obtainable.

As described above, the quality element target value is a preset value. Thus, in the assist process, the molding state data target value can be obtained in advance. That is, in the assist process, the procedure of obtaining the molding state data target using the first learning model is not performed every time when molding of a new article is performed. This leads to a reduction in the execution time of the assist process.

The second learning model generating unit 56 needs to create the second learning model before the value of the molding condition element is changed. For this reason, as described above, the second learning model generating unit 56 creates the second learning model in advance.

One concern with this approach is that the relationship between the molding condition element and the molding state data may change with the age deterioration of the injection molding apparatus 1. For example, due to worn parts or other causes, the actual dwell pressure may differ between the initial pressure and the pressure after the age deterioration even when the command value used to control the dwell pressure remains unchanged. Therefore, the second learning model generating unit 56 preferably update the second learning model in accordance with the age deterioration of the injection molding apparatus 1. This allows the age deterioration of the injection molding apparatus 1 to be taken into account when obtaining the molding condition element adjustment amount using the second learning model. Thus, more accurate molding condition element adjustment amount is obtainable.

Below is a description of a first example of the first learning model used in the assisting device 50 according to the first embodiment. In this example, the first learning model is a learning model relating to pressure data inside the mold 6 as the molding state data and a value indicative of the shape of a molded article as the quality element.

Figure 7:
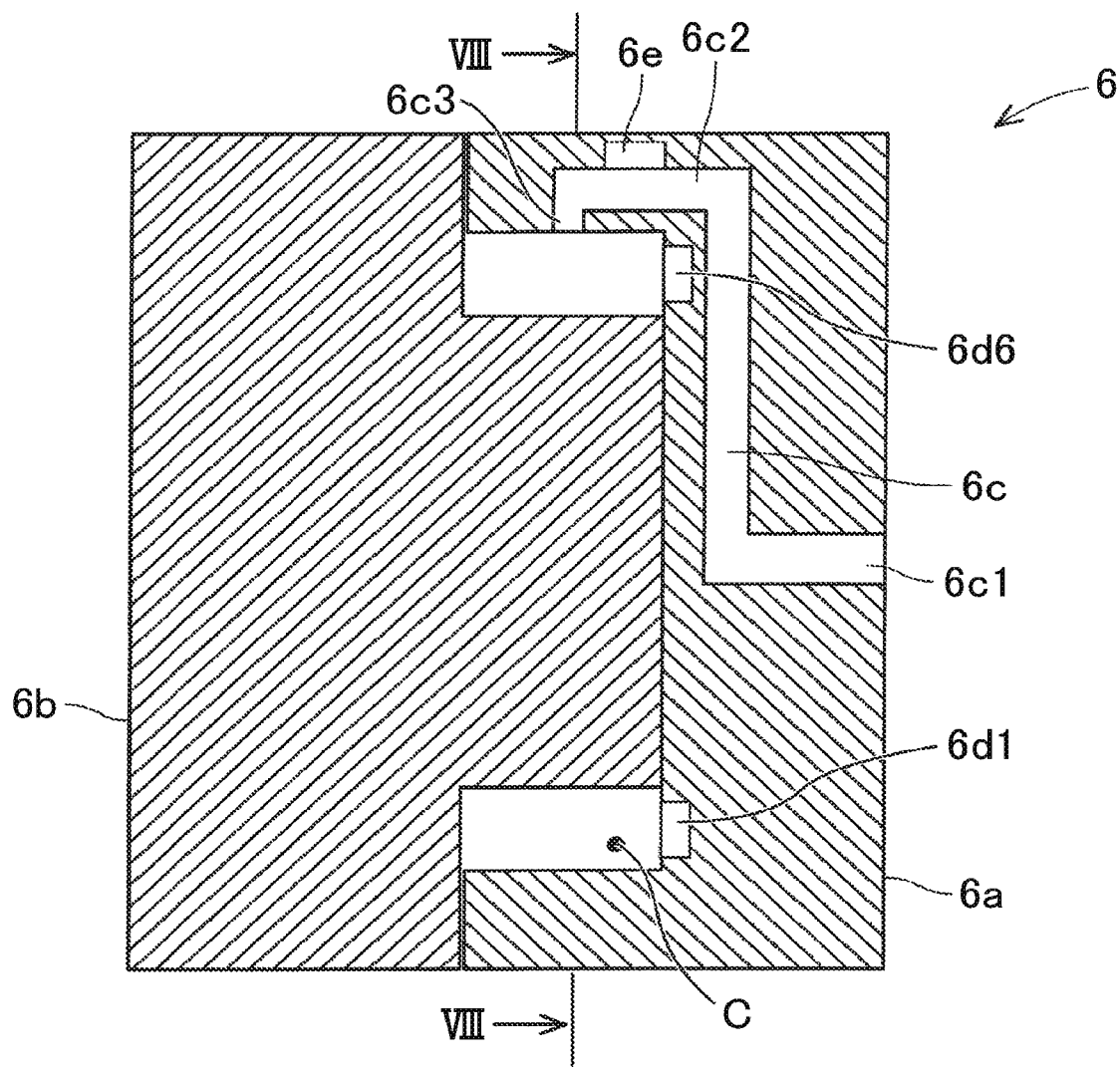
FIG. 7 is an enlarged view of a mold.
Figure 8:
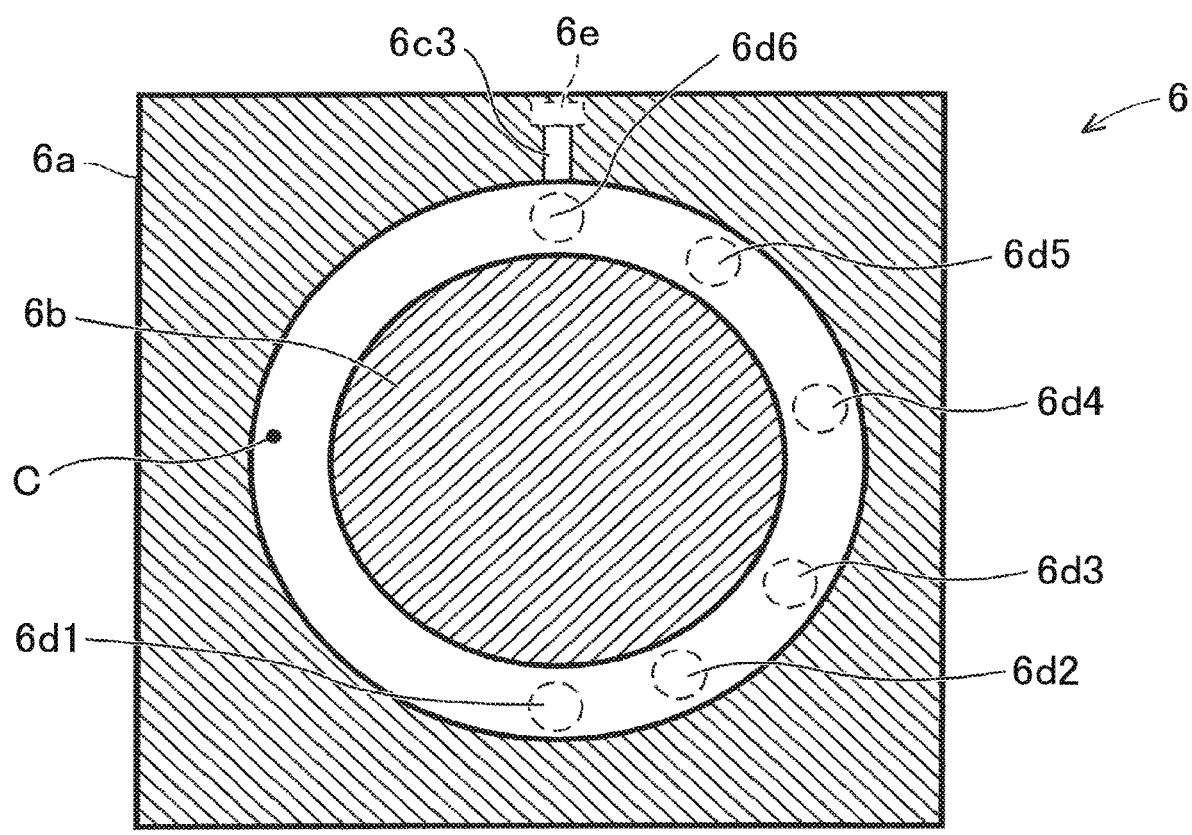
FIG. 8 is a cross-sectional view of the mold taken along line VIII-VIII in FIG. 7.

The detailed structure of the mold 6 is described with reference to FIGS. 7 and 8. The mold 6 has at least one cavity C. In this example, an article to be molded by the injection molding apparatus 1 is a cage used in a constant-velocity joint. That is, the molded article has an annular shape, in particular, a circular annular shape. The cavity C also has an annular shape, in particular, a circular annular shape. Alternatively, the molded article may have a shape other than an annular shape, such as a C-shape or a rectangular frame shape. The cavity C has a shape corresponding to the shape of the molded article.

The first mold 6a has the feed channel 6c for feeding molten material. The feed channel 6c is located between the nozzle 34 and the cavity C. The first mold 6a includes, as the feed channel 6c, one sprue 6c1, one or a plurality of runners 6c2, and one or a plurality of gates 6c3. In this example, it is assumed that the first mold 6a includes one sprue 6c1, one runner 6c2, and one gate 6c3.

The sprue 6c1 is a channel for receiving molten material fed from the nozzle 34. The runner 6c2 is a channel branching from the sprue 6c1, and the molten material fed to the sprue 6c1 flows into the runner 6c2. The gate 6c3 is a channel for guiding the molten material in the runner 6c2 to the cavity C and has a flow cross-sectional area smaller than the flow cross-sectional area of the runner 6c2.

When the cavity C has an annular shape and the first mold 6a has one gate 6c3, a flow path for the molten material flowing inside the cavity C extends from the gate 6c3 in the circumferential direction of the annular shape of the cavity C. That is, inside the cavity C, the molten material starts to flow from a location adjacent to the gate 6c3 and finally reaches a location farthest from the gate 6c3.

The mold 6 may has a plurality of cavities C. In this case, the first mold 6a has runners 6c2 and gates 6c3 in the same number as the cavities C, and the molten material fed to the sprue 6c1 is fed to the cavities C via the corresponding runners 6c2 and gates 6c3.

As already described, the mold 6 includes the first pressure sensor 6d. Specifically, the mold 6 includes, as the first pressure sensor 6d, six first pressure sensors 6d1 to 6d6 for detecting pressure applied from the molten material in the cavity C. The six first pressure sensors 6d1 to 6d6 are disposed in the flow path inside the cavity C and are each at a different distance from the gate 6c3.

In the flow path, some of the six first pressure sensors 6d1 to 6d6 are located closer to the gate 6c3 than to the location farthest from the gate 6c3. In the flow path, the others of the six first pressure sensors 6d1 to 6d6 are located closer to the location farthest from the gate 6c3 than to the gate 6c3.

The first pressure sensor 6d1 is located farthest from the gate 6c3 in the flow path inside the cavity C. The first pressure sensor 6d2 is located the second farthest from the gate 6c3. The first pressure sensors 6d3, 6d4, and 6d5 are respectively located the third, fourth, and fifth farthest from the gate 6c3. The first pressure sensor 6d6 is located closest to the gate 6c3.

Specifically, the first pressure sensor 6d1 is located in a region where the molten material flowing into the cavity C from the gate 6c3 finally reaches. On the other hand, the first pressure sensor 6d6 is located in a region that lies on an extension of the gate 6c3 and where the molten material flowing into the cavity C from the gate 6c3 first reaches.

As already described, the mold 6 includes the second pressure sensor 6e. Specifically, the first mold 6a includes at least one second pressure sensor 6e. In this example, it is assumed that the first mold 6a includes one second pressure sensor 6e. The second pressure sensor 6e is located in any of the sprue 6c1, the runner 6c2, and the gate 6c3, and detects pressure applied from the molten material in the feed channel 6c between the nozzle 34 and the cavity C. In this example, the second pressure sensor 6e is located in the runner 6c2 and detects pressure that the first mold 6a receives from the molten material in the runner 6c2.

Figure 9A:
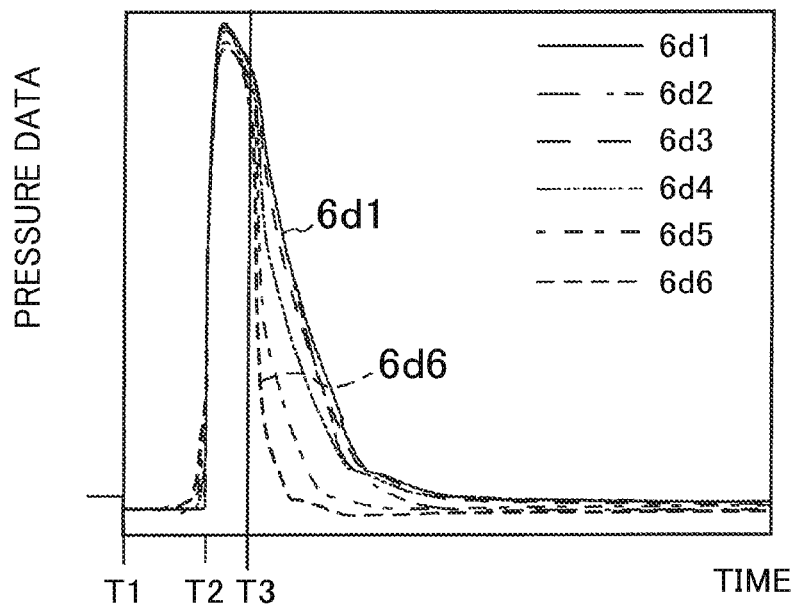
FIG. 9A is a diagram illustrating graphs of change in pressure data detected by first pressure sensors during molding under a molding condition X.
Figure 9B:
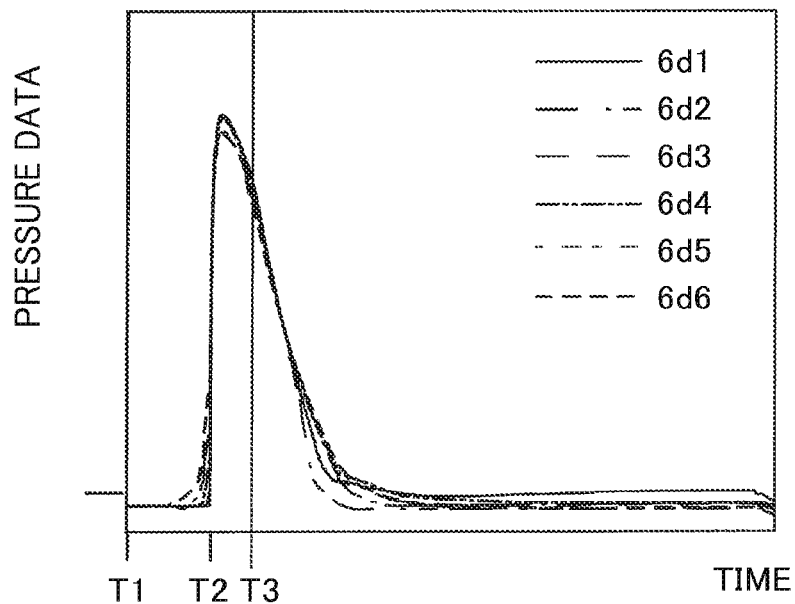
FIG. 9B is a diagram illustrating graphs of change in pressure data detected by the first pressure sensors during molding under a molding condition Y.

Pressure data detected by the six first pressure sensors 6d1 to 6d6 during successive steps including the injection filling step, the dwell step, and the cooling step is described with reference to FIGS. 9A and 9B. FIG. 9A illustrates graphs of change in the pressure data over time from the injection filling step to the cooling step during molding under a predetermined molding condition X. FIG. 9B illustrates graphs of change in the pressure data over time from the injection filling step to the cooling step during molding under a predetermined molding condition Y that is different from the molding condition X.

The roundness of the article molded under the molding condition X is greater than the roundness of the article molded under the molding condition Y. In other words, the form accuracy of the article molded under the molding condition X is less (in particular, in terms of roundness) than the form accuracy of the article molded under the molding condition Y. The relationship between the change in the pressure data and the form accuracy (in particular, in terms of roundness) is discussed below.

In FIGS. 9A and 9B, a period of time from T1 to T2 represents the injection filling step, a period of time form T2 to T3 represents the dwell step, and a period of time after T3 represents the cooling step. The dwell process in the dwell step starts from when the cavity C is filled. That is, the dwell process starts from when all the pressure data detected by the first pressure sensors 6d1 to 6d6 becomes a value that is not zero (a value that is greater than a predetermined very small value). The dwell process ends when the pressing force being applied to the screw 33 is removed. In other words, the dwell pressure reduction process in the dwell step starts from when the pressing force being applied to the screw 33 is removed. The change in the pressure data during the dwell process is hereinafter referred to as "dwell process change data", and the change in the pressure data during the dwell pressure reduction process is hereinafter referred to as "reduction process change data".

If the molten material in the cavity C shrinks uniformly over the whole area of the cavity C upon start of the dwell pressure reduction process, the form accuracy of a molded article after solidification will be improved. Further, if the molten material filling the cavity C shrinks uniformly over the whole area of the cavity C after the start of the dwell pressure reduction process, the values of the reduction process change data detected by the six first pressure sensors 6d1 to 6d6 will become close to each other. In contrast, if the degree of shrinkage of the molten material after the start of the dwell pressure reduction process varies greatly depending on the location of the molten material inside the cavity C, the values of the reduction process change data detected by the six first pressure sensors 6d1 to 6d6 will vary greatly from each other.

As can be seen from comparing the graphs illustrated in FIG. 9A and the graphs illustrated in FIG. 9B, the variation in behavior of the reduction process change data among the six first pressure sensors 6d1 to 6d6 is greater when the molding condition X is used than when the molding condition Y is used. In particular, when the molding condition X is used, there is a large variation in behavior of the reduction process change data between the first pressure sensor 6d1 and the first pressure sensors 6d6.

This indicates that there is a variation in the degree of shrinkage of the molten material filling the cavity C after the start of the dwell pressure reduction process, between the molten material located close to the gate 6c3 and the molten material located far from the gate 6c3. Such a variation in the degree of shrinkage of the molten material causes a variation in the degree of shrinkage of a molded article. Therefore, compared to the article molded under the molding condition Y, the article molded under the molding condition X has a low form accuracy and a great roundness. In summary, the difference and variation in the reduction process change data among the six first pressure sensors 6d1 to 6d6 have a high correlation with the form accuracy of a molded article.

Next, the first example of the first learning model is described in detail. The first example of the first learning model is a learning model relating to pressure data inside the mold 6 as the molding state data and a value indicative of the shape of a molded article as the quality element. The first learning model is created through machine learning in which at least the pressure data inside the mold 6 as the molding state data is used as the first learning data. In this example, the value indicative of the shape of a molded article is the roundness of the outer or inner circumferential surface of a molded article having a circular annular shape. The first learning data used to create the first learning model may include the value indicative of the shape of a molded article as the quality element. The first learning data may further include other types of molding state data in addition to the pressure data.

The pressure data is data on pressures inside the mold 6 detected by the pressure sensors 6d and 6e during the dwell pressure reduction process. The pressure data during the dwell pressure reduction process is defined here as "reduction process pressure data", and the relationship between the reduction process pressure data and an elapsed time since the start of the dwell pressure reduction process is defined here as "reduction process change data".

The reduction process pressure data inside the mold 6 includes pressure data detected by the first pressure sensors 6d1 to 6d6 during the dwell pressure reduction process. The reduction process pressure data may further include pressure data detected by the second pressure sensor 6e. The pressure data inside the mold 6 may be detected by only one or some of the first pressure sensors 6d1 to 6d6.

Preferably, the first learning data include the value indicative of a variation in the reduction process pressure data. As illustrated in FIGS. 9A and 9B, the roundness of a molded article increases with an increasing variation in the reduction process pressure data. For this reason, when the value indicative of the variation is included in the first learning data, the first learning model has a higher correlation with the form accuracy, particularly the roundness of a molded article.

Examples of the value indicative of the variation include the following: differences in reduction process pressure data among the pressure sensors 6d and 6e; variances among the reduction process pressure data; differences in time integral value among the reduction process change data; variances in time integral value among the reduction process pressure data; differences in mean value of time integral values among the reduction process pressure data; and variances in mean value of time integral values among the reduction process pressure data. As another example, differences in dwell pressure reduction time among the first pressure sensors 6d1 to 6d6 may be used as the value indicative of the variation. The dwell pressure reduction time is the time taken by the pressure data to drop to or below a predetermined value close to zero after the start of the dwell pressure reduction process.

In this example, the assist process, illustrated in FIG. 6, according to the first embodiment is performed as follows. First, the quality element target value obtaining unit 61 obtains, as a quality element target value, a target value for the roundness of the outer or inner annular circumferential surface of a molded article (S1). Next, the molding state data target value obtaining unit 62 obtains, using the first learning model, a molding state data target value corresponding to at least the roundness target value as the quality element target value (S2). In this example, the molding state data target value obtaining unit 62 obtains, as the molding state data target value, a target value for a value related to reduction process pressure data inside the mold 6.

Then, the molding state data obtaining unit 63 obtains at least the reduction process pressure data as molding state data (S3). Next, on the basis of the molding state data and the molding state data target value, the second molding state data adjustment amount obtaining unit 64 obtains a molding state data adjustment amount (S4). The molding state data adjustment amount is the difference between the molding state data and the molding state data target value. After that, the subsequent procedures (S5, S6) are performed in the same manner as already described, and then the value of the molding condition element is changed (S7). Thus, by performing the assist process using the first example of the first learning model, a molding condition that improves the roundness of a molded article as the quality element can be determined.

Next, a second example of the first learning model used in the assisting device 50 according to the first embodiment is described. In this example, the first learning model is a learning model relating to pressure data inside the mold 6 as the molding state data and the mass of a molded article as the quality element.

Figure 10:
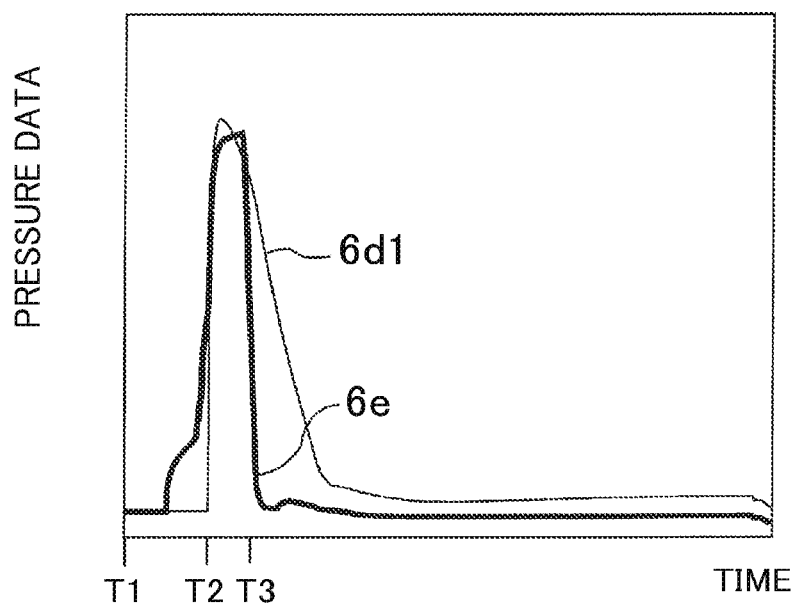
FIG. 10 is a diagram illustrating graphs of change in pressure data detected by first and second pressure sensors.

Pressure data detected by the first pressure sensor 6d and the second pressure sensor 6e during successive steps including the injection filling step, the dwell step, and the cooling step is described with reference to FIG. 10. FIG. 10 illustrates graphs of change in the pressure data over time from the injection filling step to the cooling step during molding of a molded article under a predetermined molding condition. T1, T2, and T3 in FIG. 10 respectively represent the same time points as those in FIGS. 9A and 9B. The pressure data during the dwell process is defined here as "dwell process pressure data", and the relationship between the dwell process pressure data and an elapsed time since the start of the dwell process is defined here as "dwell process change data".

The inventors of the present invention have found that the mass of the molded article has correlations with the dwell process pressure data. Specifically, as the dwell process is performed for a longer time, the molded article has a larger mass. Further, as the dwell process is performed under high dwell pressure, the molded article has a larger mass. In addition, as the dwell process change data has a larger variation, the molded article has a smaller mass.

Compared to the pressure of the molten material in the cavity C, the pressure of the molten material in the feed channel 6c of the mold 6 has a high correlation with the pressure applied from the injection device 3 during the dwell process. This is because the feed channel 6c is located closer to the nozzle 34 than the cavity C. Since the first pressure sensor 6d1 is located farthest from the gate 6c3 in the flow path inside the cavity C, a loss of pressure applied to the first pressure sensor 6d1 by the molten material filled inside the cavity C becomes maximum.

As a result, the pressure data detected by the first pressure sensor 6d1 becomes smaller than the pressure data detected by the second pressure sensor 6e. A larger difference in the pressure data between the first and second pressure sensors 6d1 and 6e indicates a larger loss of pressure, which results in a smaller mass.

Next, the second example of the first learning model is described in detail. In the second example, the first learning model is a learning model relating to pressure data inside the mold 6 as the molding state data and the mass of a molded article as the quality element. The first learning model is created through machine learning in which at least the pressure data inside the mold 6 as the molding state data is used as the first learning data. The first learning data used to create the first learning model may include the mass of a molded article as the quality element. The first learning data may further include other types of molding state data in addition to the pressure data.

The pressure data is data on pressure inside the mold 6 that is detected by the pressure sensors 6d and 6e during the dwell process. The dwell process pressure data inside the mold 6 includes pressure data detected by the first pressure sensors 6d1 to 6d6 during the dwell process and pressure data detected by the second pressure sensor 6e during the dwell process. The pressure data inside the mold 6 may be detected by only one or some of the first pressure sensors 6d1 to 6d6.

Preferably, the first learning data include the time integral value of the dwell process change data representing the duration of the dwell process and a dwell pressure during the dwell process. It is noted that the duration of the dwell process and the dwell pressure during the dwell process have different degrees of influence on the mass of a molded article. For this reason, it is preferable that the first learning data include at least one of the duration of the dwell process itself and the pressure data itself. For example, the first learning data may include, as the pressure data itself, at least one of the maximum value and the mean value of the pressure data detected by the first pressure sensors 6d1 to 6d6 during the dwell process.

Further, it is preferable that the first learning data include a variation in the dwell process pressure data among the pressure sensors 6d and 6e. As already described, as the dwell process pressure data has a larger variation, the molded article has a smaller mass. For this reason, when a value indicative of the variation is included in the first learning data, the first learning model has a higher correlation with the mass of a molded article.

In particular, as the difference between the pressure data at the location farthest from the gate 6c3 and the pressure data in the feed channel 6c becomes larger, the mass of a molded article becomes smaller. Therefore, it is preferable that the dwell process pressure data inside the mold 6 includes pressure data detected during the dwell process by the first pressure sensor 6d1 located farthest from the gate 6c3 and pressure data detected during the dwell process by the second pressure sensor 6e located in the feed channel 6c.

Preferably, the first learning data include at least one of the following, as the value indicative of the variation: differences in dwell process pressure data among the pressure sensors 6d and 6e; variances among the dwell process pressure data; differences in time integral value among the dwell process change data; variances in time integral value among the dwell process change data; differences in mean value of time integral values among the dwell process change data; and variances in mean value of time integral values among the dwell process change data.

In this example, the assist process, illustrated in FIG. 6, according to the first embodiment is performed as follows. First, the quality element target value obtaining unit 61 obtains, as the quality element target value, a target value for the mass of a molded article (S1). Next, the molding state data target value obtaining unit 62 obtains, using the first learning model, a molding state data target value corresponding to at least the mass target value as the quality element target value (S2). In this example, the molding state data target value obtaining unit 62 obtains, as the molding state data target value, a target value for a value related to dwell process pressure data inside the mold 6.

Then, the molding state data obtaining unit 63 obtains at least the dwell process pressure data as the molding state data (S3). Next, on the basis of the molding state data and the molding state data target value, the second molding state data adjustment amount obtaining unit 64 obtains a molding state data adjustment amount (S4). The molding state data adjustment amount is the difference between the molding state data and the molding state data target value. After that, the subsequent procedures (S5, S6) are performed in the same manner as already described, and then the value of the molding condition element is changed (S7). Thus, by performing the assist process using the second example of the first learning model, a molding condition that allows the mass of a molded article as the quality element can be determined to meet a desired value.

Figure 11:
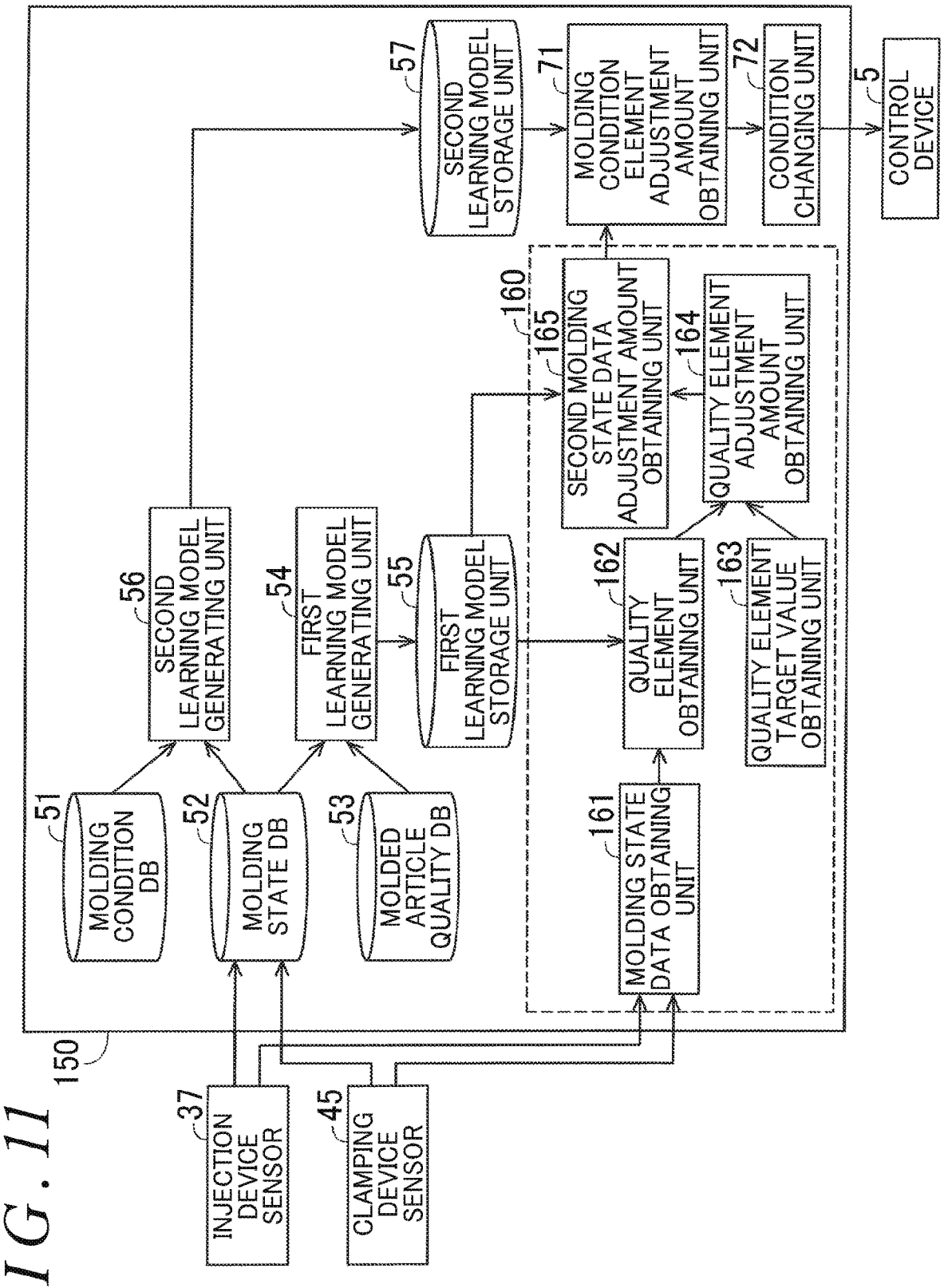
FIG. 11 is a block diagram of a molding condition determination assisting device according to a second embodiment.

Next, the structure of a molding condition determination assisting device 150 (hereinafter referred to simply as the assisting device 150) according to a second embodiment is described with reference to FIG. 11. The assisting device 150 has some common structural features with the assisting device 50 of the first embodiment. The common structural features are denoted by the same reference symbols, and their description is omitted for the sake of brevity.

The assisting device 150 includes a portion functioning in a learning phase of machine learning and a portion functioning in an inference phase of the machine learning. Specifically, as illustrated in FIG. 11, the assisting device 150 includes the following, as the portion functioning in the learning phase: the molding condition database (DB) 51; the molding state database (DB) 52; the molded article quality database (DB) 53; the first learning model generating unit 54; the first learning model storage unit 55; the second learning model generating unit 56; and the second learning model storage unit 57. Further, the assisting device 150 includes the following, as the portion functioning in the inference phase: the first learning model storage unit 55; the second learning model storage unit 57; a molding state data adjustment amount obtaining unit 160; the molding condition element adjustment amount obtaining unit 71; and the condition changing unit 72.

That is, the molding state data adjustment amount obtaining unit 160 is the only difference of the assisting device 150 according to the second embodiment from the assisting device 50 according to the first embodiment. Below is a description of the molding state data adjustment amount obtaining unit 160.

As with the molding state data adjustment amount obtaining unit 60 of the first embodiment, the molding state data adjustment amount obtaining unit 160 obtains, using the first learning model, the molding state data adjustment amount during molding of a subject article. Specifically, the molding state data adjustment amount obtaining unit 160 obtains the molding state data adjustment amount on the basis of the molding state data detected by the injection device sensor 37 and the clamping device sensor 45.

The molding state data adjustment amount obtaining unit 160 includes a molding state data obtaining unit 161, a quality element obtaining unit 162, a quality element target value obtaining unit 163, a quality element adjustment amount obtaining unit 164, and a second molding state data adjustment amount obtaining unit 165.

During molding of a subject article, the molding state data obtaining unit 161 obtains molding state data detected by the injection device sensor 37, the clamping device sensor 45, and the pressure sensors 6d and 6e. The molding state data obtained by the molding state data obtaining unit 161 is of the same type as the molding state data stored in the molding state database 52. That is, the molding state data may be information about how a target data item being detected behaves over time or may be a predetermined statistical amount obtained from the behavior information.

The quality element obtaining unit 162 obtains, using the first learning model, the value of a quality element corresponding to the molding state data obtained by the molding state data obtaining unit 161. The quality element target value obtaining unit 163 obtains a quality element target value for the subject article. For example, the quality element target value may be a threshold value for determining whether or not the subject article is a conforming article in terms of the quality element. The quality element target value is preset information.

The quality element adjustment amount obtaining unit 164 calculates the difference between the quality element target value obtained by the quality element target value obtaining unit 163 and the value of the quality element obtained by the quality element obtaining unit 162, and obtains the calculated difference as a quality element adjustment amount.

The second molding state data adjustment amount obtaining unit 165 obtains, using the first learning model stored in the first learning model storage unit 55, a molding state data adjustment amount corresponding to the quality element adjustment amount obtained by the quality element adjustment amount obtaining unit 164. The molding state data adjustment amount obtained by the second molding state data adjustment amount obtaining unit 165 has a value equivalent to the difference between a molding state data target value and the molding state data detected by the sensors 37 and 45.

Figure 12:
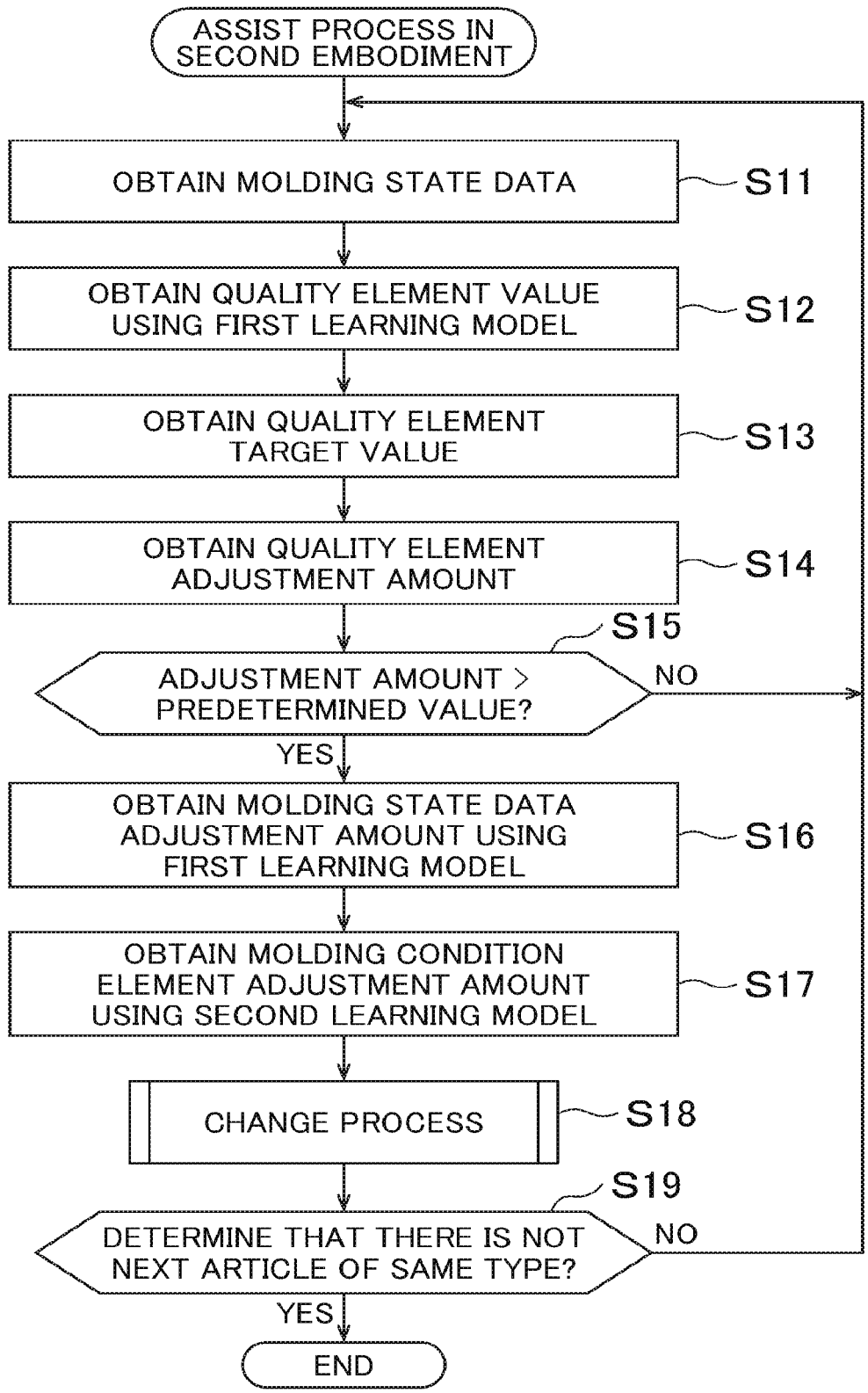
FIG. 12 is a flowchart of an assist process performed by the molding condition determination assisting device according to the second embodiment.

Referring to FIG. 12, an assist process performed by the assisting device 150 according to the second embodiment is described. The assist process has a learning phase and an inference phase. For the sake of brevity, only the inference phase of the assist process is described here. That is, the following description refers to the assist process to be performed after the first learning model and the second learning model are created.

First, the molding state data obtaining unit 161 obtains molding state data (S11). Next, the quality element obtaining unit 162 obtains, using the first learning model, the value of a quality element corresponding to the molding state data (S12). Then, the quality element target value obtaining unit 163 obtains a quality element target value (S13). After that, on the basis of the value of the quality element and the quality element target value, the quality element adjustment amount obtaining unit 164 obtains a quality element adjustment amount (S14). The quality element adjustment amount is the difference between the value of the quality element and the quality element target value.

Then, the second molding state data adjustment amount obtaining unit 165 determines whether the quality element adjustment amount is greater than a predetermined value (S15). If the quality element adjustment amount is not greater than the predetermined value (S15: No), the assist process returns to step S11 and repeats the above procedures. In contrast, if the quality element adjustment amount is greater than the predetermined value (S15: Yes), the second molding state data adjustment amount obtaining unit 165 obtains, using the first learning model, a molding state data adjustment amount (S16). Next, the molding condition element adjustment amount obtaining unit 71 obtains, using the second learning model, a molding condition element adjustment amount (S17).

Then, the condition changing unit 72 changes the value of a molding condition element in the control device 5, on the basis of the molding condition element adjustment amount (S18). If it is not determined that there is not a next article to be molded that is of the same type as the molded article (S19: No), the assist process returns to step S11 and repeats the same procedures for the next article to be molded. In contrast, if it is determined that there is not a next article to be molded that is of the same type (S19: Yes), the assist process ends. If there is a next article to be molded that is of a different type from the molded article, the assist process restarts from step S11.

As described above, in the molding state data adjustment amount obtaining unit 160, the quality element obtaining unit 162 uses the first learning model to infer the value of the quality element corresponding to the molding state data. Then, the quality element adjustment amount obtaining unit 164 obtains the quality element adjustment amount. After that, the second molding state data adjustment amount obtaining unit 165 uses the first learning model to obtain the molding state data adjustment amount. In this way, the first learning model is used in two processes. Also in the second embodiment, the molding state data adjustment amount is reliably obtainable.

Next, a first example of the first learning model used in the assisting device 150 according to the second embodiment is described. In this example, the first learning model is a learning model relating to pressure data inside the mold 6 as the molding state data and a value indicative of the shape of a molded article as the quality element. The first example of the first learning model used in the assisting device 50 according to the first embodiment may be used as the first example of the first learning model used in the assisting device 150 according to the second embodiment.

In this example, the assist process, illustrated in FIG. 12, according to the second embodiment is performed as follows. First, the molding state data obtaining unit 161 obtains at least reduction process pressure data (S11). Next, the quality element obtaining unit 162 obtains, using the first learning model, the value of a quality element corresponding to the reduction process pressure data (S12). In this example, the value of the quality element is the roundness of the outer or inner circumferential surface of a molded article. Then, the quality element target value obtaining unit 163 obtains, as the quality element target value, a target value for the roundness of the molded article (S13). Next, on the basis of the roundness of the molded article as the value of the quality element and the target value for the roundness of the molded article as the quality element target value, the quality element adjustment amount obtaining unit 164 obtains a quality element adjustment amount (S14). The quality element adjustment amount is the difference between the value of the quality element and the quality element target value.

After that, the subsequent procedures (S15, S16, S17) are performed in the same manner as already described, and then the value of the molding condition element is changed (S18). Thus, by performing the assist process using the first example of the first learning, a molding condition that improves the roundness of a molded article as the quality element can be determined.

Next, a second example of the first learning model used in the assisting device 150 according to the second embodiment is described. The second example of the first learning model is a learning model relating to pressure data inside the mold 6 as molding state data and the mass of a molded article as a quality element. The second example of the first learning model used in the assisting device 50 according to the first embodiment may be used as the second example of the first learning model used in the assisting device 150 according to the second embodiment.

In this example, the assist process, illustrated in FIG. 12, according to the second embodiment is performed as follows. First, the molding state data obtaining unit 161 obtains, as molding state data, at least dwell process pressure data (S11). Next, the quality element obtaining unit 162 obtains, using the first learning model, the value of a quality element corresponding to the dwell process pressure data (S12) In this example, the value of the quality element is the mass of a molded article. Then, the quality element target value obtaining unit 163 obtains, as a quality element target value, a target value for the mass of the molded article (S13). Next, on the basis of the mass of the molded article as the value of the quality element and the target value for the mass of the molded article as the quality element target value, the quality element adjustment amount obtaining unit 164 obtains a quality element adjustment amount (S14). The quality element adjustment value is the difference between the value of the quality element and the quality element target value.

After that, the subsequent procedures (S15, S16, S17) are performed in the same manner as already described, and then the value of the molding condition element is changed (S18). Thus, by performing the assist process using the second example of the first learning model, a molding condition that allows the mass of a molded article as the quality element can be determined to meet a desired value.

What is claimed is:

1. A device for assisting molding condition determination and for use with a molding method that molds an article by feeding molten material into a cavity of a mold of a molding apparatus, the device comprising:
    a first learning model storage unit that stores a first learning model created through machine learning in which at least molding state data detected during molding of previous articles by a sensor attached to the molding apparatus is used as first learning data, the first learning model based on the molding state data of previous articles and a quality element of each of the previous articles;
    a second learning model storage unit that stores a second learning model created through machine learning in which the molding state data and a molding condition element are used as second learning data, the second learning model based on the molding state data of previous articles and the molding condition element of each of the previous articles;
    a molding state data adjustment amount obtaining unit that obtains, using the first learning model, a molding state data adjustment amount by calculating a difference between molding state data during the molding of the article detected by the sensor and a molding state data target value obtained by using the first learning model; and
    a molding condition element adjustment amount obtaining unit that obtains, using the second learning model, an adjustment amount for the molding condition element corresponding to the molding state data adjustment amount.

2. The device according to claim 1, wherein the first learning model is created through machine learning in which both the molding state data and the quality element of the previous articles are used as the first learning data.

3. The device according to claim 1, wherein:
    the molding state data adjustment amount obtaining unit includes a molding state data target value obtaining unit and a second molding state data adjustment amount obtaining unit;
    the molding state data target value obtaining unit obtains, using the first learning model, the molding state data target value corresponding to a preset quality element target value; and
    the second molding state data adjustment amount obtaining unit obtains the molding state data adjustment amount that is the difference between the molding state data detected by the sensor and the molding state data target value.

4. The device according to claim 1, wherein:
    the molding state data adjustment amount obtaining unit includes a quality element obtaining unit, a quality element adjustment amount obtaining unit, and a second molding state data adjustment amount obtaining unit;
    the quality element obtaining unit obtains, using the first learning model, a value of the quality element corresponding to the molding state data detected by the sensor;
    the quality element adjustment amount obtaining unit obtains a quality element adjustment amount that is the difference between a preset quality element target value and the value of the quality element obtained by the quality element obtaining unit; and
    the second molding state data adjustment amount obtaining unit obtains, using the first learning model, the molding state data adjustment amount corresponding to the quality element adjustment amount.

5. The device according to claim 4, wherein:
    the molding method performs a dwell process under a predetermined dwell pressure for a predetermined period of time and then performs a dwell pressure reduction process that reduces the dwell pressure;
    the sensor includes a plurality of pressure sensors for individually detecting the pressure applied from the fed molten material at different locations in the cavity;
    the molding state data includes a plurality of pressure data pieces each detected by a corresponding one of the plurality of pressure sensors during the dwell pressure reduction process;
    the quality element is a shape of the article; and
    the quality element obtaining unit obtains, using the first learning model, a value indicative of a shape of the article corresponding to at least the plurality of pressure data pieces.

6. The device according to claim 4, wherein:
    the molding method performs a dwell process under a predetermined dwell pressure for a predetermined period of time and then performs a dwell pressure reduction process that reduces the dwell pressure;
    the sensor includes a pressure sensor for detecting pressure applied from the fed molten material in the cavity of the mold;
    the molding state data includes pressure data detected by the pressure sensor during the dwell process;
    the quality element is a mass of the article; and
    the quality element obtaining unit obtains, using the first learning model, the mass of the article corresponding to at least the pressure data.

7. The device according to claim 1, further comprising a condition changing unit that changes a value of the molding condition element in a control unit of the molding apparatus on a basis of the adjustment amount for the molding condition element obtained by the molding condition element adjustment amount obtaining unit.

8. The device according to claim 1, wherein the second learning model storage unit stores the second learning model that has been updated in accordance with age deterioration of the molding apparatus.

9. The device according to claim 1, wherein:
    the sensor includes a pressure sensor for detecting pressure applied from the fed molten material in the cavity of the mold; and
    the molding state data includes pressure data detected by the pressure sensor.

10. The device according to claim 9, wherein:
    the molding method performs a dwell process under a predetermined dwell pressure for a predetermined period of time and then performs a dwell pressure reduction process that reduces the dwell pressure;

the sensor includes a plurality of pressure sensors for individually detecting the pressure generated at different locations inside the cavity;

the molding state data includes a plurality of pieces of the pressure data, each of which is detected by a corresponding one of the plurality of pressure sensors during the dwell pressure reduction process;

the quality element is a shape of the article;

the first learning model is created through machine learning in which at least the plurality of pressure data pieces are used as the first learning data; and the first learning model relates to a value indicative of the shape and the plurality of pressure data pieces.

11. The device according to claim 9, wherein:

the molding method performs a dwell process under a predetermined dwell pressure for a predetermined period of time and then performs a dwell pressure reduction process that reduces the dwell pressure;

the molding state data includes the pressure data detected by the pressure sensor during the dwell process;

the quality element is a mass of the article;

the first learning model is created through machine learning in which at least the pressure data is used as the first learning data; and the first learning model relates to the mass and the pressure data.

12. An injection molding apparatus comprising the device according to claim 1.

* * * * *